United States Patent
Reardon et al.

(10) Patent No.: US 7,230,729 B1
(45) Date of Patent: Jun. 12, 2007

(54) PRINTER PIPELINE BYPASS IN HARDWARE-READY FORMAT

(75) Inventors: Laura I. Reardon, Meridian, ID (US);
David W. Magnuson, Boise, ID (US);
Randall E. Grohs, Eagle, ID (US);
Johnny M. Lewis, Meridian, ID (US);
Charles K. Keyes, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/571,947

(22) Filed: May 15, 2000

(51) Int. Cl.
*G06F 15/00* (2006.01)
*G06K 1/00* (2006.01)

(52) U.S. Cl. .................... 358/1.13; 358/1.15

(58) Field of Classification Search ............. 358/1.13, 358/261.1, 426, 428, 429, 1.1, 1.11, 1.9, 1.15, 358/1.16, 1.18; 382/173, 232, 244; 395/114, 395/109, 112
See application file for complete search history.

(56) References Cited

U.S. PATENT DOCUMENTS

| | | | | |
|---|---|---|---|---|
| 5,809,167 A | * | 9/1998 | Al-Hussein | ............ 382/190 |
| 5,852,742 A | | 12/1998 | Vondran, Jr. et al. | ... 395/800.28 |
| 5,915,079 A | * | 6/1999 | Vondran et al. | ............ 358/1.15 |
| 6,002,814 A | * | 12/1999 | Chadez | ............ 382/303 |
| 6,081,211 A | * | 6/2000 | de Queiroz et al. | .......... 341/65 |
| 6,144,811 A | * | 11/2000 | Ohori et al. | ............ 399/9 |
| 6,151,134 A | * | 11/2000 | Deppa et al. | ............ 358/1.15 |
| 6,431,777 B1 | * | 8/2002 | Silverbrook | ............ 400/578 |
| 6,463,481 B1 | * | 10/2002 | Lupien et al. | ............ 710/22 |
| 6,476,931 B1 | * | 11/2002 | Aizikowitz et al. | ....... 358/1.18 |
| 6,522,774 B1 | * | 2/2003 | Bacus et al. | ............ 382/133 |
| 6,538,762 B1 | * | 3/2003 | Terashima et al. | ........ 358/1.15 |

* cited by examiner

*Primary Examiner*—David Moore
*Assistant Examiner*—Thierry L. Pham

(57) ABSTRACT

An apparatus for generating a data processing pathway in a hardware-ready format is provided which includes a computer-based client and an output device. The client has processing circuitry, memory, a raster formatter, and a software-based data compression apparatus configured to render a rasterized, bitmapped image into image data in a hardware-ready format. The output device communicates with the client and has hardware-ready program code and a hardware-assisted print device. The hardware-assisted print device includes a printer controller, with the printer controller including processing circuitry, memory, and a data decompressor. The hardware-ready program code is operative via the printer controller to receive the hardware-ready image data from the client and render output containing the image to the hardware-assisted print device. A method is also provided.

17 Claims, 5 Drawing Sheets

US 7,230,729 B1

PRINTER PIPELINE BYPASS IN HARDWARE-READY FORMAT

FIELD OF THE INVENTION

This invention relates to the processing and transfer of data, and more particularly to the architecture of a direct data path extending from an external source into a hardware imaging pipeline for a hard copy output device such as a printer or a copier.

BACKGROUND OF THE INVENTION

Prior art printers include rendering systems that reside in a printer. Application software is used to create a digital image, and a print driver is used to convert the digital image into a rasterized form using well-known techniques in the art that is suitable to be received into a video buffer of a laser printer. Internally of the printer, a print data pipeline of the printer performs several operations upon the transferred print data as the print data enters the pipeline in preparation for printing. These operations include print data compression, print data decompression, color space conversion, and half-toning. Typically, the various processing operations are performed by a processor under the control of printer firmware.

Another technique uses a hardware-limited, low-cost implementation (such as a Sleek implementation) that relies on a host to obtain processing power and buffering capabilities. An imaging laser is raced over an I/O port at real-time. However, such implementation occurs at real-time and is dependent on performance of the input/output (I/O) channel. Therefore, such implementation is time constrained. There exists a need to provide for an implementation that is less dependent upon the I/O channel, has no real-time constraints, and can work over a network system.

SUMMARY OF THE INVENTION

A hardware-ready printing and/or copying architecture provides a direct data path extending from an external source into a hardware imaging pipeline for a hard copy output device such as a printer or a copier. According to one construction the external source is a scanner. According to another construction, the external source is a client computer such as a personal computer (PC).

According to one aspect of this invention, an apparatus for generating a data processing pathway in a hardware-ready format is provided which includes a computer-based client and an output device. The client has processing circuitry, memory, a raster formatter, and a software-based data compression apparatus configured to render a rasterized, bitmapped image into image data in a hardware-ready format. The output device communicates with the client and has hardware-ready program code and a hardware-assisted print device. The hardware-assisted print device includes a printer controller, with the printer controller including processing circuitry, memory, and a data decompressor. The hardware-ready program code is operative via the printer controller to receive the hardware-ready image data from the client and render output containing the image to the hardware-assisted print device.

According to another aspect of this invention, an apparatus is provided for transferring data from a client to a hardware imaging pipeline of a host including a computer-based image rendering device and an output device. The image rendering device includes a processor, memory operative to hold image data, a raster formatter, and a software-based data compression apparatus configured to render a rasterized, bitmapped image into image data in a hardware-ready format. The output device communicates with the image rendering device and has hardware-ready program code and a print device. The print device includes processing circuitry, memory operative to receive the image data in the hardware-ready format, and a data decompressor. The hardware-ready program code is executed on the processing circuitry such that the output device receives the image data in the hardware-ready format from the client and renders output containing the image.

According to yet another aspect of this invention, a method for transferring image data from a client to a slave includes: providing a computer-based host and an output device, the host having a software-based data compression apparatus, the output device having a hardware imaging pipeline, and the output device communicating with the host; rendering a bitmapped image on the host; formatting the bitmapped image into rasterized hardware-ready bits of data; compressing the bits of data into image data in a hardware-ready format; transferring the image data in the hardware-ready format from the host to the output device; and decompressing the transferred image data in the hardware-ready format with the output device.

One advantage is provided by the ability to send data to a document generating device or output device, such as a printer or a copier, in a manner that does not require that a lot of data processing be carried out at the device which increases performance and reduces a data bottleneck that might otherwise occur with the device hardware.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. One exemplary implementation is described below and depicted with reference to the drawings comprising an apparatus and method for providing a hardware-ready bits path directly into the hardware imaging pipeline of a hard copy output device such as a printer or a copier. While the invention is described via preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference as being presently understood in the art.

For purposes of this disclosure, the term "JetReady" refers to a hardware-ready bits architecture wherein a hardware path is provided directly into a hardware imaging pipeline for a hard copy output device. A JetReady mode provides such a hardware path and allows data to flow through the printer as quickly as possible from an external source, directly to hardware on the hard copy output device. According to one construction described below, the hard copy output device is a printer that implements a JetReady mode.

Also for purposes of this disclosure, the term "JetSend™" refers to a communications protocol for use over any bidirectional transport medium such as Transmission Control Protocol/Internet Protocol (TCP/IP), and including both wired and wireless transport medium. The JetSend communications protocol is provided by Hewlett-Packard Company, and is detailed on the Internet at http://www.jetsend.hp.com. Such solution is presently commercially available, and does not require the use of a driver or an intermediary, such as e-mail or a print server, in order to send information from one JetSend-enabled device to another JetSend device. For example, documents can be captured with one JetSend-enabled device, then sent to a second JetSend-enabled device, such as a printer.

Figure 1:
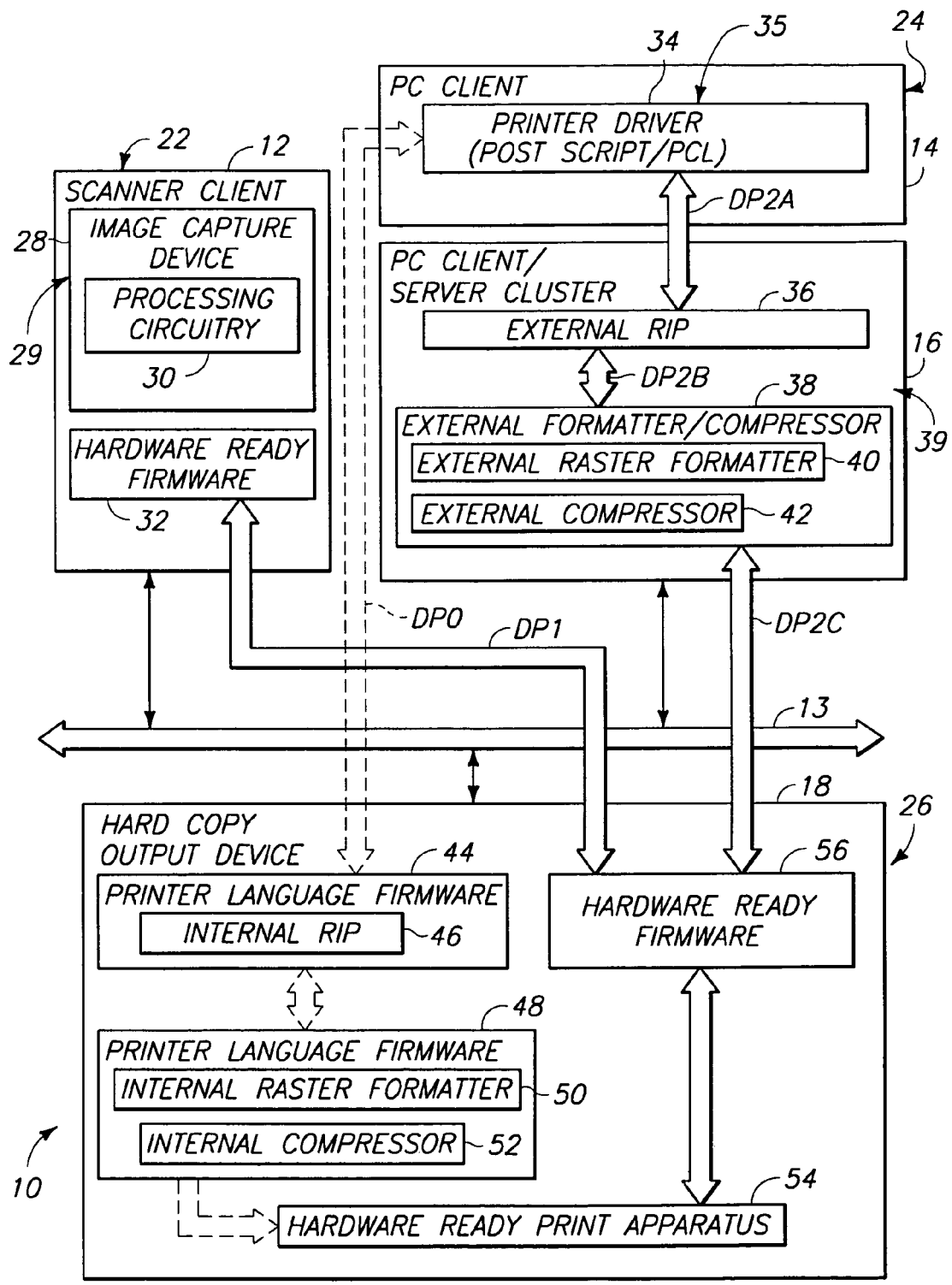
FIG. 1 is a high level simplified schematic block diagram of a direct data path transfer apparatus using an architecture that provides a direct data path extending from an external source into a printer's hardware imaging pipeline in accordance with one implementation of the present invention.

FIG. 1 illustrates a hardware-ready hard copy output system identified by reference numeral 10. Such system 10 includes clients 12 and 14, cluster controller 16, hard copy output device 18, and communication bus 20. Communication bus 20 facilitates transfer of data between clients 12 and 14, cluster controller 16 and hard copy output device 18. Cluster controller 16 is a control unit that manages several client devices and/or peripheral devices, such as PC 24. According to one construction, client 12 is a scanner client such as a scanner 22, client 14 is a personal computer (PC) client such as a host computer provided in the form of a personal computer (PC) 24, and hard copy output device 18 is a printer. According to other constructions, clients 12 and 14 can be any device in a local area network having processing capabilities that is capable of requesting information or applications from a file server. Similarly, according to another construction hard copy output device 18 can be a copier or a multiple function peripheral (MFP).

Scanner 22 includes an image capture device 28 that forms a peripheral input device operative to that digitize images and generate analog or digital signals corresponding to the images. Image capture device 28 includes processing circuitry 30, such as a microprocessor or a micro-controller, as well as memory (not shown) that are configured to form an image rendering device 29. Scanner 22 also includes print job hardware-ready firmware 32 which, in one embodiment, comprises scanner hardware that matches hardware within printer 26. Firmware 32 provides scanner hardware that generates "hardware-ready" print jobs for printer 26, which facilitates a fast "print" or "copy" mode via communication bus 13.

Personal computer (PC) 24 includes a printer driver 34 which is a file used by a program to execute commands in order to operate the hard copy output device 18, or more particularly, printer 26. Printer driver 34 can be implemented with Postscript, PCL, or more generally, a page description language. Printer driver 34 provides another image rendering device 35.

As shown in FIG. 1, PC 24 is one of several devices (not shown) that are connected with communication bus 13 via PC client/server cluster controller 16. A cluster controller forms a control unit that can be used to manage several peripheral devices such that load balancing can be used to distribute workload over multiple systems or peripheral devices. Cluster controller 16 includes an external raster image processor (RIP) 36 and a hardware-specific formatter/compressor apparatus 38. Formatter/compressor apparatus 38 includes an external raster formatter 40 and an external compressor 42.

In operation, raster image processor (RIP) 36 performs raster conversion on the page description language (PDL) data, such as Postscript or PCL, received from printer driver 34, and generates a generic raster data format. RIP 36 utilizes the recent availability of increased processing power to perform such conversion.

Also in operation, raster formatter 40 of formatter/compressor 38 converts generic raster data from RIP 36 into a compressed hardware-ready data format. RIP 36 cooperates with formatter/compressor 38 to provide hardware-ready firmware 39.

Printer 26 includes printer language firmware 44, an internal formatter/compressor apparatus 48, a hardware-ready print subsystem 54 and hardware-ready firmware 56. Printer language firmware 44 includes an internal raster image processor (RIP) 46. Formatter/compressor apparatus 48 includes an internal raster formatter 50 and an internal compressor 52.

A traditional, prior art data path for transferring print job data from PC 24 to printer 26 is identified as "DP0" in FIG. 1. More particularly, a prior art data transfer occurs between printer driver 34 and printer language firmware 44. Such a traditional data path "DP0" sends high-level printer language from printer driver 34 to printer language firmware 44. However, such prior art technique requires that an image rendering system be provided in a printer; for example, firmware 44 and 48 (of FIG. 1).

In contrast, data paths provided by Applicant's invention are identified by "DP1" and "DP2". "DP1" is a data path extending between scanner 22 and printer 26 for transferring print jobs to printer 26 from scanner 22. Scanner 22 is print optimized to send hardware-ready printer data to hardware-ready firmware 56 of printer 26. "DP2A-C" cooperate to provide a data path extending between PC 24 and printer 26 for transferring print jobs to printer 26 from PC 24. More particularly, printer driver 34 sends data in the form of a page description language, such as PCL, to RIP 36 via data path "DP2A". Rip 36 sends generic raster data to formatter/compressor 38 via data path "DP2B". Finally, formatter/compressor 38 sends compressed hardware-ready format data to hardware-ready firmware 56 via data path "DP2C".

Figure 2:
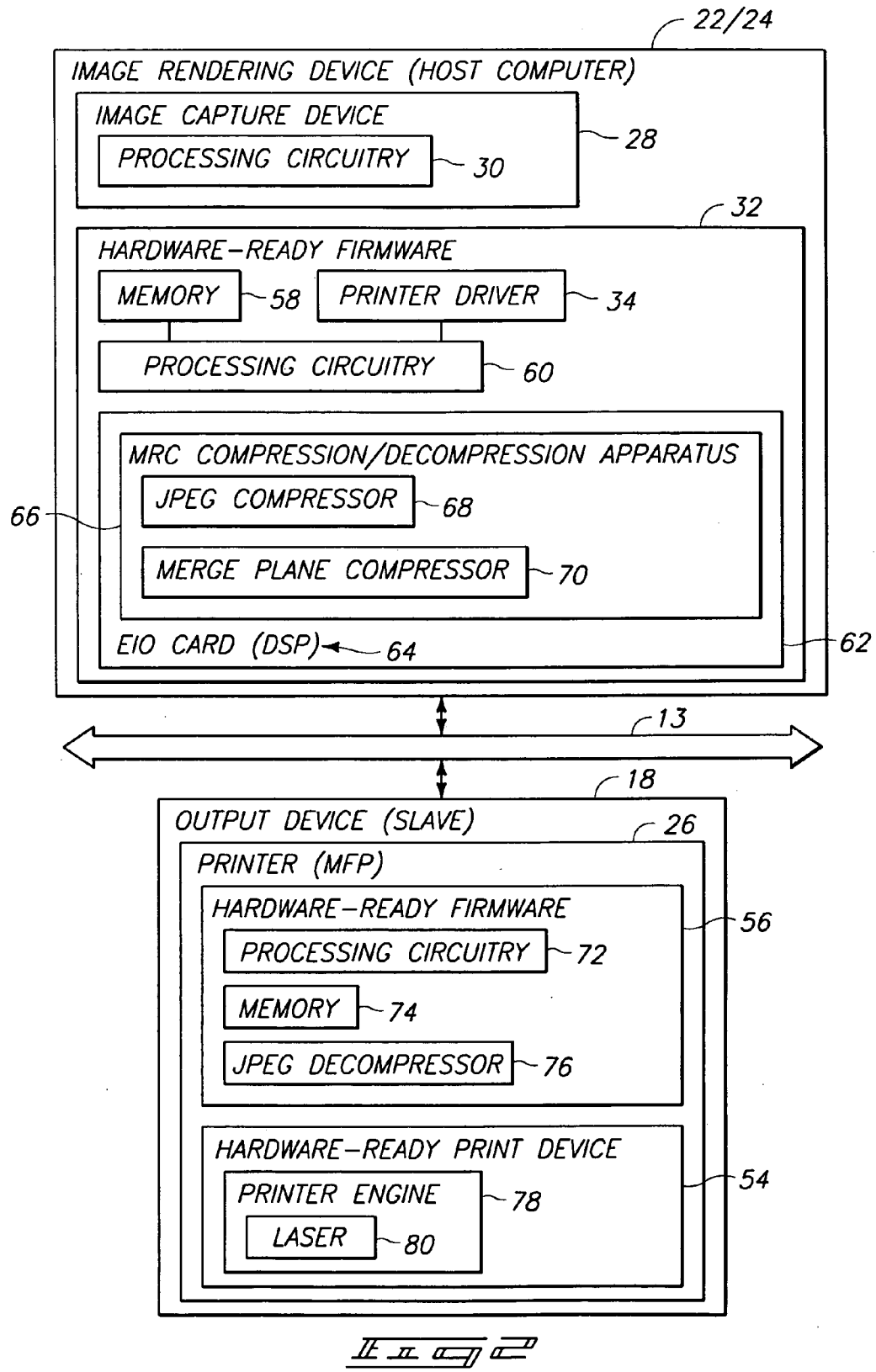
FIG. 2 is a further detailed simplified schematic block diagram of the apparatus of FIG. 1 illustrating in greater detail specific hardware components.

FIG. 2 is a further detailed and simplified schematic block diagram of the hardware-ready hard copy output system of FIG. 1 illustrating in greater detail specific hardware components. For purposes of illustration, an image rendering device is shown, such as scanner 22, to detail one client from which Applicant's invention can be implemented with a hard copy output device 18. Scanner 22 includes image capture device 28 and hardware-ready firmware 32. Image capture device 28 includes processing circuitry 30, such as a microprocessor or micro-controller, and memory (not shown).

Hardware-ready firmware 32 includes a printer driver 34, memory 58, processing circuitry 60, and a mixed raster content (MRC) compression/decompression apparatus 66. Apparatus 66 is provided on an enhanced input/output (EIO) card 62, and includes a digital signal processor (DSP) 64. Apparatus 66 includes a JPEG compressor 68 and a merge plane compressor 70.

As used herein, EIO refers to an enhanced input/output comprising a hardware interface for Hewlett-Packard printers which is used for adding an internal print server and network adaptor, a hard disk and other plug-in functionality. EIO cards are configured to use a PCI bus.

Hard copy output device 18 can be implemented as a multiple function peripheral (MFP) that includes a printer 26. Printer 26 includes hardware-ready firmware 56 and a hardware-ready print device 54. Hardware-ready firmware 56 includes processing circuitry 72, memory 74, and a JPEG compressor 76. In one form, processing circuitry 72 is provided within a microprocessor or a micro-controller. Hardware-ready print device 54 includes a printer engine 78 that includes a laser 80 that is operative to impart images onto a photoconductive drum (not shown), for example, as used on a laser printer.

In operation, a "JetReady" operating mode is implemented via a hardware-ready bits architecture to provide a hardware path directly into a hardware imaging pipeline for a hard copy output device. As shown in FIG. 1, a hardware path is provided directly into hardware-ready firmware 56 of printer 26. Applicant's invention utilizes hardware and software resources that exist outside printer 26 in order to perform a range of tasks in order to assist in printing hard copy output. A significant amount of information processing is performed on the host device, such as on PC client 24 and/or scanner 22. The extent of processing that is performed on printer 26 depends on the printer hardware capabilities that are imparted to printer 26. As shown in FIG. 1, external rip 36 is capable of supporting any printer language, including PostScript and PCL, or rip 36 can support other graphics languages such as Graphics Device Interface (GDI). GDI is a graphics display system provided in Microsoft Windows™.

By utilizing the features of Applicant's invention, the JetReady mode enables skillable performance through upgradable soft printers or virtual printers that are capable of being managed by Internet tools, and exist in a skillable distributed environment. Examples of such skillable distributed environment can range from a single client's software environment to a cluster of network multiple processor hard copy servers such as PC client/server cluster 16.

Applicant's invention provides a pathway directly into the hardware imaging pipeline of printer 26 by bypassing the rendering system that normally resides within printer 26. Namely, printer language firmware 44 and printer language firmware 48 comprise a rendering system which is bypassed when using Applicant's invention. Pursuant to Applicant's invention, data is allowed to flow through printer 26 as quickly as possible from an external source, such as scanner 22 or PC 24, and directly to hardware of printer 26; namely, hardware-ready print subsystem 54 (of FIG. 1).

Some prior art systems utilize a fast-raster operating mode which requires that data be decompressed and/or compressed before paper motion can begin within a printer. However, Applicant's JetReady mode allows data to be handled as little as possible by firmware 56 of printer 26 (see FIG. 1), which allows the fastest possible data throughput. Furthermore, while some prior art sleek implementations which race the laser over an input/output (I/O) port, Applicant's invention stores an entire page in firmware memory before beginning paper motion. For example, an entire page is stored in memory of firmware 56 (of FIG. 1), before beginning to move a piece of paper through printer 26 for printing thereon.

It is understood that the JetReady operating mode of Applicant's invention provides an interface to an output device, such as a printer, which can be used for either external rendering of print jobs or digital copying.

One benefit provided by Applicant's invention is the ability to image at speed. Given fast enough input/output (I/O) speeds, JetReady mode provides a way to deliver pre-rendered print jobs "at speed" from an external source, such as a host computer or scanner device. However, it is possible that some complex jobs may still not print at speed if they are printed over a slow parallel port or heavily congested LAN. However, depending on complexity, they can still be delivered significantly faster than if the firmware renders them, and as I/O speeds increase with the adoption of IEEE Standard 1394, this bottleneck will be reduced. IEEE Standard 1394, otherwise referred to as "firewire", is a high-speed serial bus that was originally developed by Apple Computer and Texas Instruments.

According to Applicant's invention, another benefit is provided in that JetSend performance is boosted. More particularly, JetSend initiators, including host PCs and scanners, are able to make use of JetReady mode by recognizing and negotiating the appropriate e-material. These initiators can then put single page images directly into a video system in the fastest possible way without requiring that the device's firmware decompress and recompress the entire image. The source images should meet certain criteria, which are outlined in the JetReady Criteria section below. Accordingly, e-material negotiation ensures that these criteria are met, and JetSend will continue to support other standard methods of delivery.

Applicant's invention provides another benefit by enabling a performance boost when scanning and printing documents. More particularly, a network scanner can be provided having a JPEG compressor which matches the JPEG compressor provided within a specific printer, such as printer 26 (of FIG. 1). Accordingly, such a network scanner is enabled with the capability to provide JetReady-compatible data to the printer. Such a network printer would support a JetReady operating mode through both "copy" and "JetSend" channels.

A further benefit provided by Applicant's invention is provided in the form of a convenient copy feature which can be made available in the future by simply attaching a color scanner directly to the print device with an intelligent, DSP-equipped enhanced I/O (EIO) card. Accordingly, a convenience copy feature is enabled via such connection. This feature could be added in the future with minimal, if any, firmware modifications, and would use the JetReady operating mode to deliver scanned/compressed pages to a printer's hardware as fast as possible.

Even furthermore, Applicant's invention is beneficial because the provision of a JetReady mode in a printer, or output device, also enables compatibility with future host-based printing software systems. It allows a printer, or output device, to support host-based features and printer languages such as Level 3 PostScript, "Soft" collated mopying, etc., whether they are developed by the device manufacturer or third party solutions partners.

The implementation of a JetReady operating mode entails several features, including color matching, halftoning, and the utilization of a specific data format. More particularly, JetReady mode supports sRGB (Screen Match) color. The color space selection applies to the entire page. Since JetReady color information is compressed in JPEG/YCC color space, system firmware selects the YCC-to-CMYK (screen match) color table to load into the hardware at video time.

The JetReady operating mode includes the ability to implement halftoning. More particularly, for JetReady mode, the firmware supports halftone selection via the personality and applies the same halftone to the entire page. As an option or addition, JetReady mode may support a halftone map, allowing halftone selection on a per pixel basis.

JetReady mode also utilizes a special data format. More particularly, a JetReady tagged object format specifies resolution and margin values and provides a method for wrapping compression objects. According to one construction, there are two supported JetReady modes for a printer: JPEG-only and MRC (mixed raster content), which are described below in greater detail:

A. JetReady JPEG Mode

JPEG mode uses a lossy JPEG compression channel to deliver an entire page for printing. The lossless channel and merge plane are NULL. This mode is similar to the "snap to lossy" mode inside a printer's Internet Protocol (IP). However, JPEG encoded data must meet certain criteria, as described below under JetReady Criteria.

B. JetReady MRC Mode (Mixed Raster Content)

MRC mode is a specialized compression scheme that utilizes both lossy and lossless compression channels in a printer's hardware. The method involves decomposing an RGB pageframe into these two channels: one lossiness binary merge plane which is compressed using SALTO, and another lossy JPEG channel which can contain either grayscale or color data. The JPEG channel is compressed further using a "Rep-Encoding" compression phase to remove redundant repeating strings. Restart markers are not placed in the JPEG stream for this mode. This mode requires that the firmware perform only simple "Rep-Decoding" (decompression), which returns the JPEG channel to its hardware-ready state.

Figure 3:
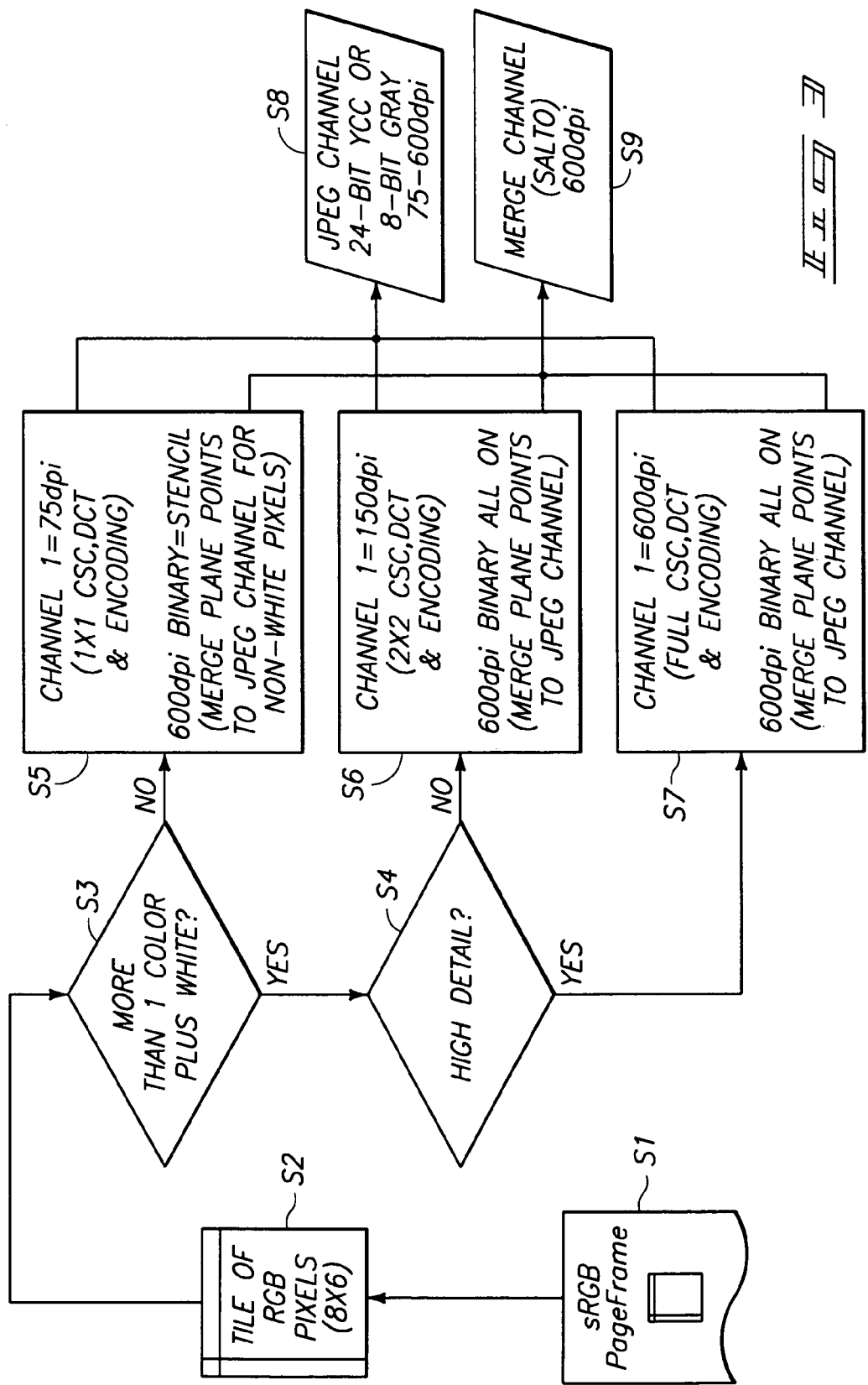
FIG. 3 is a schematic flow diagram illustrating the process steps involved in implementing the mixed raster content (MRC) decomposition and compression block which the JetReady dynamic link library (DLL) performs on a host.

FIG. 3 illustrates details of mixed raster content (MRC) decomposition and compression. The JetReady dynamic link library (DLL) performs this process on the host. The process is laid out according to Steps "S1" through "S9". The process begins with data in the form of an sRGB page frame.

In Step "S2", RGB pixels are tiled.

In Step "S3", a query is performed to determine whether there is more than one color in addition to white which is detected in the tiled pixels. If there is not more than one color, the process proceeds to Step "S5". If there is more than one color, the process proceeds to Step "S4".

In Step "S4", a query is made to determine whether there exists high detail in the tile of RGB pixels. If there is not high detail detected, the process proceeds to Step "S6". If there is high detail, the process proceeds to Step "S7".

In Step "S5", plane points are merged to a JPEG channel for all non-white pixels. After performing Step "S5", the output from Steps "S5" and "S7" are combined at Step "S8".

In Step "S6", plane points are merged to a JPEG channel. After performing Step "S6", the output of Steps "S6" and "S7" are combined to arrive at Step "S9".

In Step "S7", plane points are merged to a JPEG channel. After performing Step "S7", the output of Steps "S6" and "S7" to arrive at Step "S9".

In Step "S8", a JPEG channel is realized having 24-bit YCC or 8-bit Gray.

In Step "S9", a merge channel is realized comprising a lossless channel in the form of a SALTO channel.

FIG. 4 is an example of an original RGB raster image and the contents of the resulting mixed raster content (MRC) channels (merge and JPEG) after the MRC process is performed.

More particularly, a rendered, or captured, image 82 is illustrated having a combination of black, or gray level, text 88; red text 90; and a visual image 89.

Figure 4A:
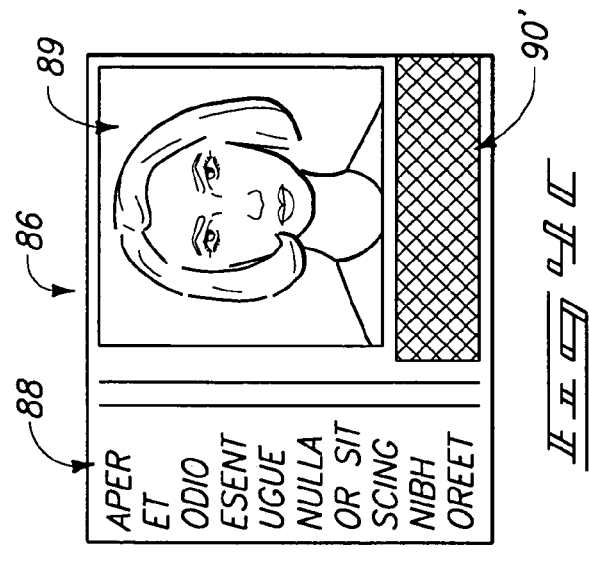
FIG. 4 is a simplified schematic diagram of an exemplary original RGB raster image and the contents of the resulting mixed raster content (MRC) channels, merge and JPEG, after the MRC process has been performed.
Figure 4B:
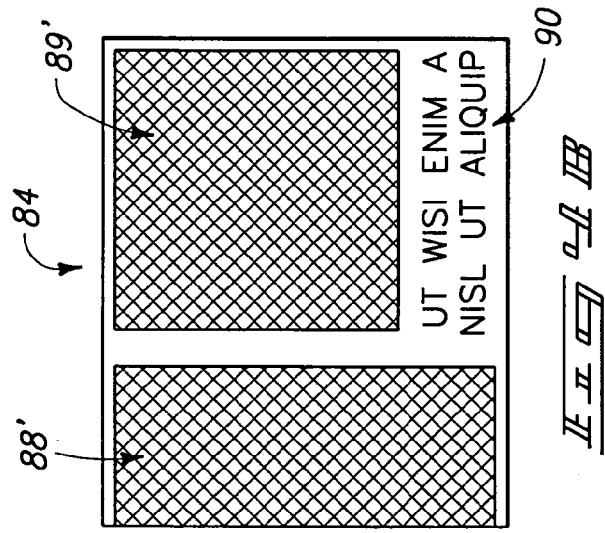

FIG. 4B illustrates a resulting merge plane comprising the merge channel shown at Step "S9" of FIG. 3 which is derived via the process illustrated in FIG. 3 when starting out with the image 82 depicted in FIG. 4A. More particularly, the black, or gray scale, text 88', corresponding with text 88 (of FIG. 4A), is shown following a merge plane implementation. Likewise, image 89', corresponding with image 89 (of FIG. 4A), is shown following a merge plane operation. Finally, red text 90 corresponds with text 90 (of FIG. 4A) following a merge plane operation.

Figure 4C:
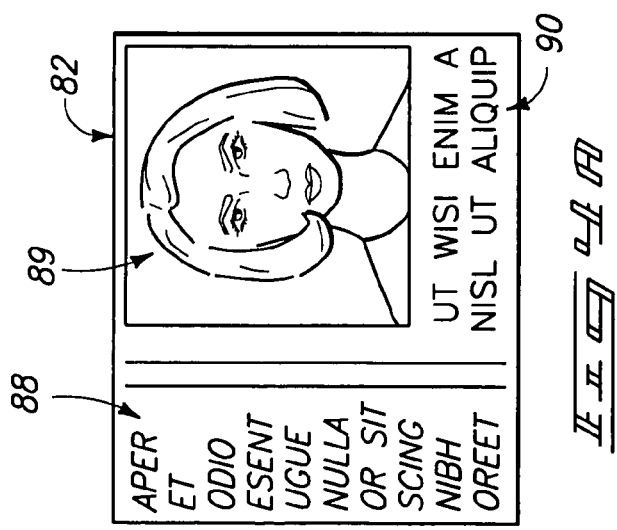

FIG. 4C illustrates the resulting JPEG channel corresponding with Step "S8" (of FIG. 3) which is derived from implementing the process of FIG. 3 on rendered image 82 (of FIG. 4A). More particularly, black, or gray scale, text 88 corresponds with text 88 (of FIG. 4A). Red text 90' is derived from text 90 (of FIG. 4B). Image 89 corresponds with image 89 (of FIG. 4).

Figure 5:
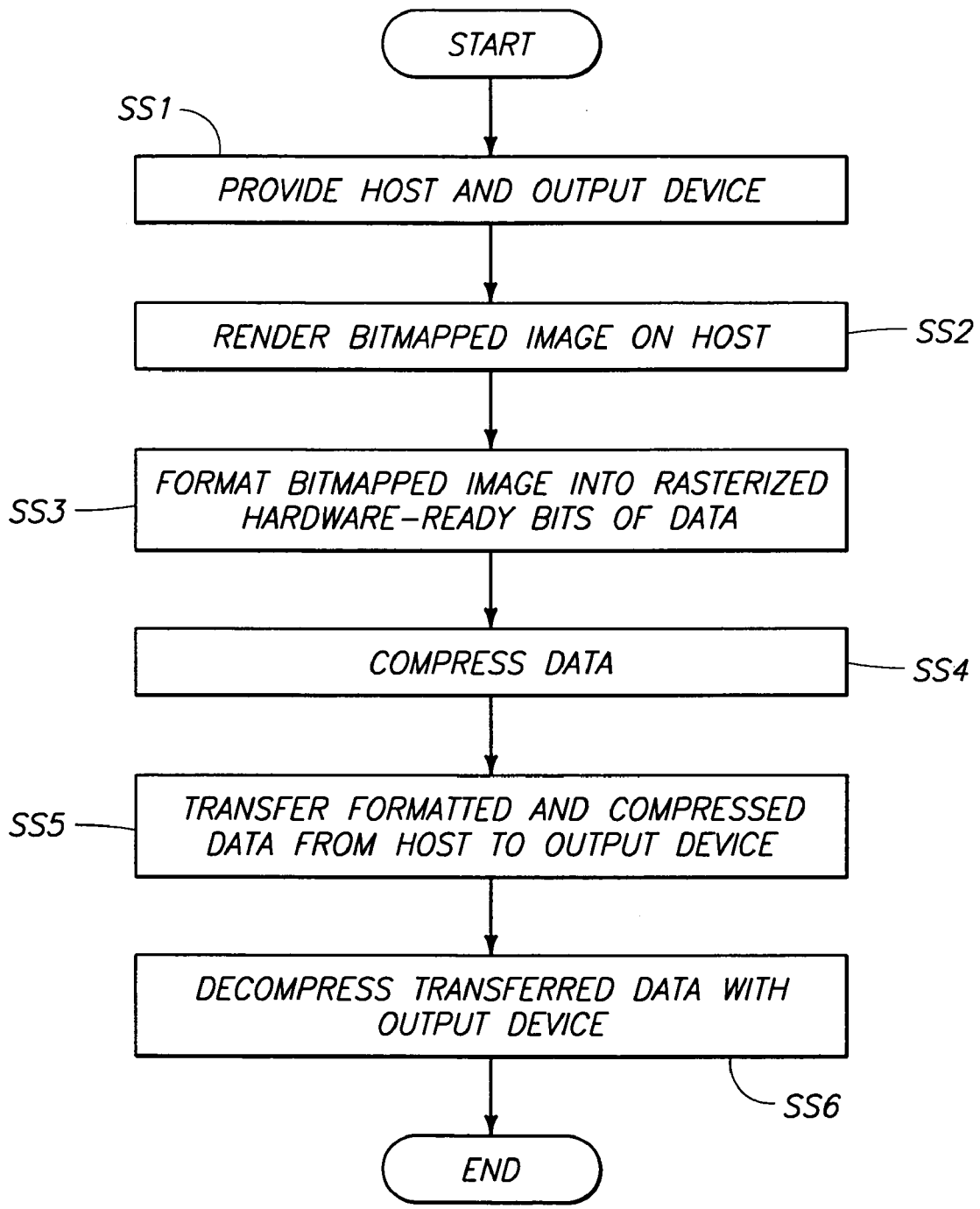
FIG. 5 is a process flow diagram of one method for practicing the invention.

FIG. 5 illustrates a process flow diagram according to one method for practicing the invention. More particularly, a method is provided for transferring image data from a client to a slave. This process is laid out according to Steps "SS1" through "SS6". The process begins at Step "SS1".

In Step "SS1", a host and an output device are provided. The output device has a hardware imaging pipeline, and the output device communicates with the host. After performing Step "SS1", the process proceeds to Step "SS2".

In Step "SS2", a bitmapped image of the host is rendered. After performing Step "SS2", the process proceeds to Step "SS3".

In Step "SS3", the bitmapped image is formatted into rasterized hardware-ready bits of data. After performing Step "SS3", the process proceeds to Step "SS4".

In Step "SS4", the data is compressed. After performing Step "SS4", the process proceeds to Step "SS5".

In Step "SS5", the formatted and compressed data is transferred from the host to the output device. After performing Step "SS5", the process proceeds to Step "SS6".

In Step "SS6", the transferred data is decompressed with the output device. After performing Step "SS6", the process terminates.

JetReady Criteria

According to one exemplary implementation, whether JetReady is encoded as JPEG-only or as MRC mode, the following criteria must be met:

1. Only baseline JPEG is supported (no progressive JPEG).

2. The raster image must be 600×600 dpi. No scaling is supported in the hardware.

3. Color data must be encoded in YCC color space.

4. Grayscale data must be encoded as single-component JPEG (luminance only).

5. Raster data must be 32-bit aligned before compression.

6. Raster data must be presented to the printer as portrait data (landscape rotation must be performed outside the printer).

7. Page width must be a multiple of 16.

8. Page height must be a multiple of 8.

9. The raster image must be padded to the specified width & height.

10. Sub-sampling modes supported are 4:4:4, 4:2:2 and 4:1:1 (no vertical subsampling).

JetReady Language

For one exemplary implementation, JetReady has been implemented using PCLXL Vendor Unique Commands. A JetReady print job continues to use PJL and PCLXL for things such as job control, paper handling and other feature selection. As with a fast-raster implementation in another exemplary implementation, a "Vendor Unique Command" (VUC) construct is used. The portion of PCLXL used to wrap JetReady is a subset of the entire language. The vendor unique blocks contain tagged JetReady objects (see below).

JetReady is Little Endian

* *Binary JetReady Data is little endian: 1st byte is lowest-order* *

For the one exemplary implementation, a JetReady Vendor Unique Command is: 1752178945 (0x68702101)

Binary JetReady Data (One Block Per Vendor Unique Command)

Each VUC produces a single block, or packet of data that is the size specified in the VUC construct. Each of these packets may contain any number of tagged JetReady objects as long as the size of all the objects together matches the size of the VUC block.

Following is the structure for a single tagged JetReady object within a VUC packet:

```
{
Word16    TagId;
Word32    SizeOrValue;    // Either Size (# of bytes to follow) or Data
                          // Value (depends on TagId value
Byte      Data[ ];        // Data bytes (optional, depending on TagId
                          value)
}
JetReady TagId Values (Tapped Objects):
//    MSB = 1 (32-bit size field + Data follows)
//    MSB = 0 (32-bit int value follows - no other data)
// Valid TagIds:
//    0x1111 = JetReady Version (Value = 0x12345678)
//    0x0081 = Start Page (Value = JetReady Type)
//    0x0082 = End Page (Value = JetReady Type)
//    0x0001 = Horiz. Resolution (pixels) - (Value)
//    0x0002 = Vert. Resolution (pixels) - (Value)
//    0x0010 = Left Margin (pixels) - (Value)
//    0x0011 = Top Margin (pixels) - (Value)
//    0x0020 = Current Line Number
//    0x0021 = Number of lines in next block (precedes compressed
//             block to indicate a decompressed size)
//    0x8040 = JPEG Header - (Size + Data)
//    0x8041 = JPEG Block - (Size + Data)
//    0x8042 = Rep-Encoded JPEG Block - (Size + Data)
//    0x0142 = JPEG-Rep Size (Value)
//    0x8049 = JPEG Footer - (Size + Data)
//    0x8051 = SALTO Merge Block (Size + Data)
```

0x1111—JetReady Version

For the one exemplary implementation, this value is 0x12345678.

0x0081—Start Page

The value indicates the JetReady Type:
0x01=JPEG ONLY
0x11=MRC (Mixed Raster Content: JPEG+SALTO)

0x0082—End Page

The value indicates the JetReady Type and MUST MATCH the value specified in the Start Page tag.

0x0001—Horizontal Resolution

0x0002—Vertical Resolution

These values are specified in DPI, and should be 600 for the one exemplary implementation.

0x0010—Left Margin

0x0011—Top Margin

Minimum margins are 100 pixels. Margins are relative to the upper left hand corner of the page, and don't need to be changed to accommodate paper size differences. For example, margins of 100,100 on a Letter page will place the JetReady image in the same position (relative to the upper left hand corner) as margins of 100,100 on an A4 page.

0x0020—Current Line Number

Not used for the one exemplary implementation.

0x0021—Number of Lines in the Next Block

This value indicates how many lines of compressed data are present in each block (JPEG, JPEG-REP or SALTO) that succeeds this command. The value need not be reset between compressed data blocks, unless the number of lines in a compressed raster block changes. The firmware accumulates "NUMBER OF LINES RECEIVED" based on this value, and verifies that it receives the correct number of lines for the page between the "Start Page" tag and the "End Page" tag. There is an accumulator for both JPEG data and SALTO data (if MRC mode is being used).

0x8040—JPEG Header

Should precede any JPEG or SALTO blocks. Data Block should contain a baseline JPEG header, including WIDTH, HEIGHT, etc.

0x8041—JPEG Block

Contains "NUMBER OF LINES" (previously set) of compressed JPEG data.

0x0142—JPEG-Rep Size (Value)

Indicates size of JPEG REP block to follow. This size is the number of bytes occupied by the RAW JPEG data (after de-mapping). NOTE: This parameter MUST precede each and every Rep-Encoded JPEG Block (below).

0x08042—Rep-Encoded JPEG Block

Contains "NUMBER OF LINES" (previously set) of compressed JPEG data. NOTE: Each and every Rep-Encoded JPEG Block must be preceded by a "JPEG-Rep Size" parameter.

0x8051—SALTO Block

Contains "NUMBER OF LINES" (previously set) of compressed SALTO (lossless) data.

0x8049—JPEG Footer

This allows for sending a last block of JPEG data (including the end-of-image (EOI) without affecting the "NUMBER OF LINES RECEIVED" accumulator in the firmware.

An Example JetReady Session

Following is a slightly modified JETASM32 disassembly of a JetReady print session.

```
// Disassembler Input File Name =
y:\jetready\files\xl\hrb-rgb.newvuc.jpg.xl
// UEL Should Follow:
hex_raw* [
1b 25 2d 31 32 33 34 35 58     //.%-12345X
]
// PJL Should Follow:
hex_raw* [
40 50 4a 4c 20 45 4e 54 45 52 20 4c 41 4e 47 55  // @ PJL ENTER
                                                  // LANGUAGE=
41 47 45 3d 50 43 4c 58 4c 0d 0a         //PCLXL..
]
// Stream Header Should Follow:
hex_raw* [
29 20 48 50 2d 50 43 4c 20 58 4c 3b 31 3b 31 3b  //) HP-PCL XL;1;1;
43 6f 6d 6d 65 6e 74 47 75 6d 62 79 0d 0a        // CommentGumby..
]
uint16_xy 600 600 UnitsPerMeasure
ubyte eInch Measure
// Operator Position: 1
BeginSession
ubyte eDefaultDataSource SourceType
ubyte eBinaryLowByteFirst DataOrg
// Operator Position: 2
OpenDataSource
ubyte ePortraitOrientation Orientation
ubyte eLetterPaper MediaSize
ubyte eUpperCassette Media Source
// Operator Position: 3
BeginPage
uint32 1752178945 VUExtension
uint 32 676 VUDataLength
// Operator Position: 4
VendorUnique
// Embedded Data Should Follow:
dataLength 671
hex_raw* [
11 11 78 56 34 12     // JetReady Version Number
81 00 01 00 00 00     // START PAGE (MODE = 01: JPEG ONLY)
01 00 58 02 00 00     // HORIZONTAL RESOLUTION = 600
02 00 58 02 00 00     // VERTICAL RESOLUTION = 600
10 00 00 01 00 00     // LEFT MARGIN = 256
11 00 80 00 00 00     // TOP MARGIN = 128
21 00 20 00 00 00     // LINES PER BLOCK = 32
40 80 6f 02 00 00     // JPEG HEADER (size = 0x26F)
...
(0x26F bytes of JPEG HEADER)
...
]
uint32 1752178945 VUExtension
uint32 1164 VUDataLength
// Operator Position: 5
VendorUnique
// Embedded Data Should Follow:
dataLength 1159
hex_raw* [
11 11 78 56 34 12     // JetReady Version Number
41 80 7b 04 00 00     // JPEG BLOCK (size = 0x478)
...
(0x478 bytes of JPEG DATA)
...
]
uint32 1752178945 VUExtension
uint32 3015 VUDataLength
// Operator Position: 6
VendorUnique
// Embedded Data Should Follow:
dataLength 3010
hex_raw* [
11 11 78 56 34 12     // JetReady Version Number
41 80 b6 0b 00 00     // JPEG BLOCK (size = 0xBB6)
...
(0xBB6 bytes of JPEG DATA)
...
]
. . . More JPEG BLOCKS. . .
uint32 1752178945 VUExtension
uint32 156 VUDataLength
// Operator Position: 14
VendorUnique
// Embedded Data Should Follow:
dataLength 151
hex_raw* [
11 11 78 56 34 12     // JetReady Version Number
21 00 10 00 00 00     // LINES PER BLOCK = 16
41 80 85 00 00 00     // JPEG BLOCK (size = 0x85)
// 0x85 bytes of JPEG follows
14 00 50 01 40 05 00 14 00 50 01 40 05 00
14 00 50 01 40 05 00 14 00 50 01 40 05 00 14 00
50 01 40 05 00 14 00 50 01 40 05 00 14 00 50 01
40 05 00 14 00 50 01 40 05 00 14 00 50 01 40 05
00 14 00 50 01 40 05 00 14 00 50 01 40 05 00 14
00 50 01 40 05 00 14 00 50 01 40 05 00 14 00 50
01 40 05 00 14 00 50 01 40 05 00 14 00 50 01 40
05 00 14 00 50 01 40 05 00 14 00 50 01 40 05 00
14 00 50 01 40 05 00
]
uint32 1752178945 VUExtension
uint32 26 VUDataLength
// Operator Position: 15
Vendor Unique
// Embedded Data Should Follow:
dataLength 21
hex_raw* [
11 11 78 56 34 12     // JetReady Version Number
49 80 03 00 00 00     // JPEG FOOTER (3 bytes)
7f ff d9              // JPEG FOOTER BYTES (last byte +EOI
82 00 01 00 00 00     // END PAGE (Mode = 01: JPEG ONLY)
]
// Operator Position: 16
EndPage
// Operator Position: 17
CloseDataSource
// Operator Position: 18
EndSession
// UEL Should Follow:
hex_raw* [
1b 25 2d 31 32 33 34 35 58     //.%-12345X
]
```

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for generating a data processing pathway in a hardware-ready format, comprising:
   a plurality of clients;
   a control unit having processing circuitry, memory, an external raster image processor, a raster formatter, and a software-based data compression apparatus configured to render a rasterized, bitmapped image into image data in a hardware-ready format; and
   an output device communicating with the client and having hardware-ready program code and a hardware-assisted print device including a printer controller, the printer controller including processing circuitry, memory, and a data decompressor, the hardware-ready program code operative via the printer controller to receive the hardware-ready image data from the client and render output containing the image to the hardware-assisted print device;

a first data path coupling together at least one of the clients with the control unit to enable the control unit to manage the plurality of clients and the output device to distribute workload over multiple systems;

a second data path coupling together the external raster image processor with the external raster formatter to enable formatting and compression of image data from the external raster image processor; and a third data path coupling together the external raster formatter with the output device to enable transfer of formatted and compressed image data to the output device.

2. The apparatus of claim 1 wherein the image data in the hardware-ready format comprises a hardware-ready data format with a hardware-ready bits architecture in one of a JPEG mode and a mixed raster content (MRC) mode.

3. The apparatus of claim 1 wherein one of the clients further comprises a dynamic link library (DLL) configured to implement mixed raster content (MRC) decomposition and compression.

4. The apparatus of claim 1 wherein the printer controller comprises a printer formatter.

5. The apparatus of claim 1 wherein the client further comprises hardware-ready firmware configured to generate a page token containing descriptive data about a page, and produce compressed video consumable by the printer controller of the output device.

6. The apparatus of claim 1 wherein one of the clients is a host computer operative to deliver pre-rendered print jobs in the hardware-ready format to the output device.

7. The apparatus of claim 1 wherein one of the clients comprises a scanner operative to deliver pre-rendered copy jobs as image data in the hardware-ready format to the output device.

8. The apparatus of claim 1 wherein one of the clients further comprises an image-rendering device configured to render a rasterized data image externally of the output device.

9. The apparatus of claim 1 wherein the output device comprises a copier configured to implement digital copying.

10. An apparatus for transferring data from a client to a hardware imaging pipeline of a host device, comprising:

a plurality of clients;

a control unit having a processor, memory operative to hold image data, an external raster image processor, a raster formatter, and a software-based data compression apparatus configured to render a rasterized, bitmapped image into image data in a hardware-ready format;

an output device communicating with the image rendering device and having hardware-ready program code and a print device, the print device including processing circuitry, memory operative to receive the image data in the hardware-ready format, and a data decompressor, the hardware-ready program code executed on the processing circuitry such that the output device receives the image data in the hardware-ready format from the client and renders output containing the image;

a first data path coupling together at least one of the clients with the control unit to enable the control unit to manage the plurality of clients and the output device to distribute workload over multiple systems;

a second data path coupling together the external raster image processor with the external raster formatter to enable formatting and compression of image data from the external raster image processor; and a third data path coupling together the external raster formatter with the output device to enable transfer of formatted and compressed image data to the output device.

11. The apparatus of claim 10 wherein the image rendering device is a host computer.

12. The apparatus of claim 10 wherein the output device is a printer, and the image data in the hardware-ready format comprises a print job that is submitted from the image rendering device to the printer.

13. The apparatus of claim 10 wherein the output device comprises a hardware-ready print apparatus configured to receive the image data in the hardware-ready format from the memory of the output device and generate an output job.

14. The apparatus of claim 10 wherein the data compression apparatus comprises at least one of a JPEG compressor and a merge plane compressor.

15. An apparatus for generating a data processing pathway in a hardware-ready format, comprising:

a plurality of clients;

a control unit having processing circuitry, memory, an external raster image processor, a raster formatter, and a software-based data compression apparatus configured to render a rasterized, bitmapped image into image data in a hardware-ready format; and an output device communicating with the client and having hardware-ready program code and a hardware-assisted print device including a printer controller, the printer controller including processing circuitry, memory, and a data decompressor, the hardware-ready program code operative via the printer controller to receive the hardware-ready image data from the client and render output containing the image to the hardware-assisted print device;

wherein the data processing pathway is provided directly to the printer controller to receive the hardware-ready image data from the client bypassing a rendering system of the output device;

a first data path coupling together at least one of the clients with the control unit to enable the control unit to manage the plurality of clients and the output device to distribute workload over multiple systems;

a second data path coupling together the external raster image processor with the external raster formatter to enable formatting and compression of image data from the external raster image processor; and a third data path coupling together the external raster formatter with the output device to enable transfer of formatted and compressed image data to the output device.

16. An apparatus for generating a data processing pathway in a hardware-ready format, comprising:

a plurality of clients;

a control unit configured to render a rasterized, bitmapped image into image data in a hardware-ready format; and an output device communicating with the client and having hardware-ready program code and a hardware-assisted print device including a printer controller, the printer controller including a processing circuitry, memory, and a data decompressor, the hardware-ready program code operative via the printer controller to receive the hardware-ready image data from the client and render output containing the image data to the hardware-assisted print device;

wherein the printer controller is configured to directly receive the hardware-ready image data from the client bypassing a rendering system of the output device, and wherein at least an entire page of the image data is stored in the memory prior to initiating printing operations by the printer controller;

a first data path coupling together at least one of the clients with the control unit to enable the control unit to manage the plurality of clients and the output device to distribute workload over multiple systems;

a second data path coupling together the external raster image processor with the external raster formatter to enable formatting and compression of image data from the external raster image processor; and a third data path coupling together the external raster formatter with the output device to enable transfer of formatted and compressed image data to the output device.

17. An apparatus for generating a data processing pathway in a hardware-ready format, comprising:

a plurality of clients;

a control unit configured to render a rasterized, bitmapped image into image data in a hardware-ready format; and an output device communicating with the client and having hardware-ready program code and a hardware-assisted print device including a printer controller, the printer controller including a processing circuitry, memory, and a data decompressor, the hardware-ready program code operative via the printer controller to receive the hardware-ready image data from the client and render output containing the image data to the hardware-assisted print device;

wherein the printer controller is configured to directly receive the hardware-ready image data from the client, and wherein the computer-based client is configured to deliver pre-rendered print jobs directly to the printer controller bypassing a rendering system of the output device;

a first data path coupling together at least one of the clients with the control unit to enable the control unit to manage the plurality of clients and the output device to distribute workload over multiple systems;

a second data path coupling together the external raster image processor with the external raster formatter to enable formatting and compression of image data from the external raster image processor; and a third data path coupling together the external raster formatter with the output device to enable transfer of formatted and compressed image data to the output device.

* * * * *

UNITED STATES PATENT AND TRADEMARK OFFICE
CERTIFICATE OF CORRECTION

| | | |
|---|---|---|
| PATENT NO. | : 7,230,729 B1 | Page 1 of 1 |
| APPLICATION NO. | : 09/571947 | |
| DATED | : June 12, 2007 | |
| INVENTOR(S) | : Laura I. Reardon et al. | |

It is certified that error appears in the above-identified patent and that said Letters Patent is hereby corrected as shown below:

In column 9, line 49, delete "Tapped" and insert -- Tagged --, therefor.

Signed and Sealed this

Nineteenth Day of August, 2008

JON W. DUDAS
*Director of the United States Patent and Trademark Office*